US009735983B1

(12) United States Patent
Sharma et al.

(10) Patent No.: US 9,735,983 B1
(45) Date of Patent: Aug. 15, 2017

(54) ADAPTIVE LOAD BALANCING FOR SINGLE ACTIVE REDUNDANCY USING EVPN DESIGNATED FORWARDER ELECTION

(71) Applicant: Juniper Networks, Inc., Sunnyvale, CA (US)

(72) Inventors: Manoj Sharma, Cupertino, CA (US); Shrinivasa Kini, Santa Clara, CA (US); Siddharth A. Tuli, Sunnyvale, CA (US); Tapraj Singh, San Ramon, CA (US); Sunesh Rustagi, San Jose, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 55 days.

(21) Appl. No.: 14/500,120

(22) Filed: Sep. 29, 2014

(51) Int. Cl.
*H04L 12/28* (2006.01)
*H04L 12/46* (2006.01)

(52) U.S. Cl.
CPC ................................ *H04L 12/4675* (2013.01)

(58) Field of Classification Search
CPC ......... H04L 45/00; H04L 41/08; H04L 45/22; H04L 45/28; H04L 41/0668; H04L 12/1836; H04L 41/0893; H04L 45/16; H04L 12/465; H04L 45/48; H04L 12/4641; H04L 12/4633
See application file for complete search history.

(56) References Cited

U.S. PATENT DOCUMENTS

2009/0161670 A1* 6/2009 Shepherd ................ H04L 45/16 370/389
2011/0286452 A1* 11/2011 Balus .................. H04L 12/4641 370/390
2012/0201124 A1* 8/2012 Marques ................ H04L 45/28 370/221

(Continued)

FOREIGN PATENT DOCUMENTS

CN WO2015039617 A1 * 3/2015 ............ H04L 12/54

OTHER PUBLICATIONS

Sajassi et al. "BGP MPLS Based Ethernet VPN," http://tools.ietf.org/html/draft-ietf-l2vpn-evpn-05#page-23, IETF Trust, Feb. 12, 2014, 98 pages.

(Continued)

*Primary Examiner* — Yemane Mesfin
*Assistant Examiner* — Abdelilllah Elmejjarmi
(74) *Attorney, Agent, or Firm* — Harrity & Harrity, LLP

(57) ABSTRACT

A provider edge (PE) device may receive an indication to perform a designated forwarder (DF) election associated with a network segment that includes the PE device, one or more other PE devices, and a client edge (CE) device. The PE device, the one or more other PE devices, and the CE device may be associated with an Ethernet virtual private network (EVPN) that includes a group of EVPN instances (EVIs). The PE device may perform the DF election in order to determine election information associated with the PE device. The election information may include information associated with a particular EVI, of the group of EVIs, for which the PE device is to act as a DF. The PE device may provide the election information to the CE device to cause the CE device to provide traffic, associated with a particular VLAN included in the particular EVI, to the PE device.

20 Claims, 9 Drawing Sheets

(56) References Cited

U.S. PATENT DOCUMENTS

2014/0355601 A1* 12/2014 Qu ...................... H04L 12/4641 370/389
2016/0197822 A1* 7/2016 Huang ................ H04L 12/6418 370/218

OTHER PUBLICATIONS

Cisco, "Ethernet VPN (EVPN) and Provider Backbone Bridging—EVPN: Next Generation Solution for MPLS-based Ethernet Services," http://www.cisco.com/c/en/us/products/collateral/routers/asr-9000-series-aggregation-services-routers/whitepaper_c11-731864.html, May 2014, 6 pages.
Juniper Networks, "EVPN Multihoming Overview," http://www.juniper.net/techpubs/en_US/junos14.1/topics/concept/evpn-bgp-multihoming-overview.html, May 14, 2014, 13 pages.
Juniper Networks, "EVPN Overview," http://www.juniper.net/techpubs/en_US/junos14.1/topics/concept/evpns-overview.html, May 14, 2014, 2 pages.
Johnson, "Ethernet VPN (EVPN): Next-Generation VPN for Ethernet Services," Alcatel-Lucent, Feb. 2014, 33 pages.

* cited by examiner

ADAPTIVE LOAD BALANCING FOR SINGLE ACTIVE REDUNDANCY USING EVPN DESIGNATED FORWARDER ELECTION

BACKGROUND

An Ethernet virtual private network (EVPN) may allow a group of dispersed client sites (e.g., included in a virtual local area network (VLAN)) to be connected using a data link layer (e.g., layer 2) virtual bridge. An EVPN may include one or more client edge (CE) devices (e.g., routers, switches, etc.) connected to one or more provider edge (PE) devices (e.g., routers, switches, etc.).

SUMMARY

According some possible implementations, a provider edge (PE) device may comprise one or more processors to: receive an indication to perform a designated forwarder (DF) election associated with a network segment, where the network segment may include the PE device, one or more other PE devices, and a client edge (CE) device, where the PE device, the one or more other PE devices, and the CE device may be associated with an Ethernet virtual private network (EVPN), and where the EVPN may include a group of EVPN instances (EVIs); perform the DF election, associated with the network segment, in order to determine election information associated with the PE device, where the election information may include information associated with a particular EVI, of the group of EVIs, for which the PE device is to act as a DF; and provide the election information to the CE device, where the election information may be provided to cause the CE device to provide traffic, associated with a particular VLAN included in the particular EVI, to the PE device.

According to some possible implementations, a system may comprise a set of provider edge (PE) devices and a client edge (CE) device, where the set of PE devices and the CE device may be included in an Ethernet segment and may be included in an Ethernet virtual private network (EVPN), and where the EVPN may be associated with a group of EVPN instances (EVIs); where a PE device, of the set of PE devices, is to: receive an indication to perform a designated forwarder (DF) election associated with the Ethernet segment; perform the DF election, associated with the Ethernet segment, in order to determine election information associated with the PE device, where the election information may include information associated with a particular EVI, of the group of EVIs, for which the PE device is to act as a DF; and provide the election information to the CE device; and where the CE device is to: receive the election information provided by the PE device; and send traffic, associated with a particular VLAN included in the particular EVI, to the PE device.

According to some possible implementations, a method may include: receiving, by a provider edge (PE) device, an indication to perform a designated forwarder (DF) election associated with a network segment, where the network segment may include the PE device, at least one other PE device, and a client edge (CE) device, where the PE device, the at least one other PE device, and the CE device may be included in an Ethernet virtual private network (EVPN), and where the EVPN may comprise a group of EVPN instances (EVIs); performing, by the PE device, the DF election, associated with the network segment, in order to determine election information associated with the PE device, where the election information may include information associated with a particular EVI, of the group of EVIs, for which the PE device is to act as a DF; and providing, by the PE device, the election information to the CE device, where the election information may be provided to cause the CE device to process traffic, associated with VLANs included in the particular EVI, such that the traffic is provided to the PE device.

DETAILED DESCRIPTION

Figure 1:
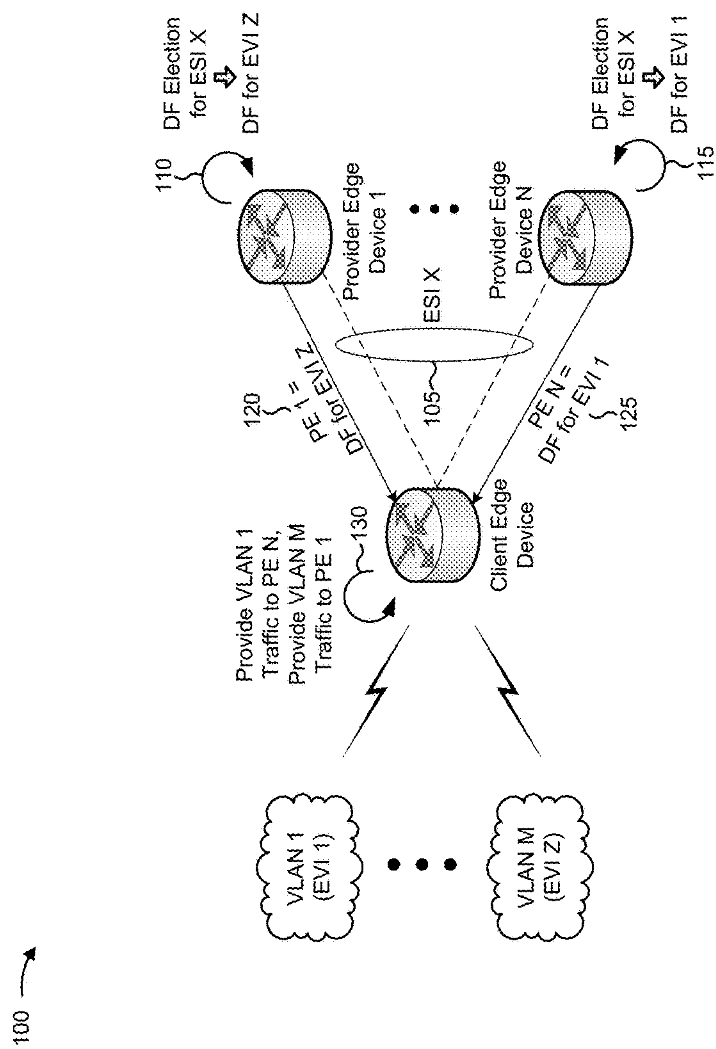
FIG. 1 is a diagram of an overview of an example implementation described herein.

The following detailed description of example implementations refers to the accompanying drawings. The same reference numbers in different drawings may identify the same or similar elements.

A client edge (CE) device may be multi-homed to two or more provider edge (PE) devices via a set of links in order to send and/or receive traffic associated with a routing and forwarding instance of an EVPN (referred to as an EVI). The set of links connecting the CE device to the two or more PE devices (referred to as an Ethernet segment) may be identified by an Ethernet segment identifier (ESI). The EVI may be associated with one or more broadcast domains, such as one or more virtual local area networks (VLANs), and each broadcast domain (e.g., each VLAN) may be identified by a VLAN identifier (e.g., a string of characters, a numerical value, etc.). In some implementations, the CE device and the two or more PE devices may be associated with multiple EVIs (e.g., such that the CE device is configured to send and/or receive traffic associated with multiple VLANs associated with corresponding multiple EVIs).

In some implementations, the CE device may be configured such that the CE device chooses a PE device, of the two or more PE devices, to which to provide traffic, associated with a VLAN (e.g., associated with an EVI) in order to load balance traffic between the PE devices included in the EVI (e.g., such that the CE device provides traffic, associated with the VLAN, only to the chosen PE device). The CE device may choose any PE device of the two or more PE devices when the CE device is configured to operating in an "all-active" mode.

However, the two or more PE devices may be configured to operate in a "single-active" mode that causes the PE devices to perform a designated forwarder (DF) election (e.g., on a per ESI basis) in order to identify a PE device, associated with the EVI, that is to forward traffic associated with VLANs included in the EVI (e.g., while other PE devices, associated with the EVI, may act as a non-DF such that the other PE devices drop traffic associated with the VLANS included in the EVI). As such, in some cases, the PE device chosen by the CE device to receive traffic associated with the VLAN may be different than the PE device elected to act as the DF for the VLAN. This may lead to traffic black holing associated with traffic for the VLAN (e.g., traffic, associated with the VLAN, may be dropped by non-DF PE device without informing a source that the traffic did not reach an intended destination).

Implementations described herein may allow DF election information, associated with a group of EVIs and a group of PE devices, to be provided to a CE device. This may allow the CE device to perform load balancing of traffic, associated with VLANs included in the group of EVIs, based on the DF election information in order to cause the traffic, associated with the VLANs, to be forwarded to corresponding elected DFs (e.g., rather than to non-DFs that may drop the traffic).

FIG. 1 is a diagram of an overview of an example implementation 100 described herein. For the purposes of example implementation 100, assume that an EVPN includes a CE device and a group of PE devices (e.g., including PE device 1 and PE device N) configured to operate in single-active mode, and that the CE device is multi-homed to PE device 1 and PE device N via a network segment (e.g., ESI X). Further, assume that a first VLAN (e.g., VLAN 1), is associated with a first EVI (e.g., EVI 1) implemented on the EVPN, and that devices in VLAN 1 are configured to provide traffic via the CE device. Also, assume that a second VLAN (e.g., VLAN M), is associated with a second EVI (e.g., EVI Z) implemented on the EVPN, and that devices in VLAN M are configured to provide traffic via the CE device.

As shown in FIG. 1, and by reference number 105, the CE device may be multi-homed to the two PE devices via ESI X that comprises a link between the CE device and PE device 1 and a link between the CE device and PE device N. As shown, PE device 1 and PE device N may perform (e.g., based on receiving an indication, based on detecting ESI X, etc.) a DF election, associated with ESI X, in order to determine which PE device (e.g., PE device 1 or PE device N) will act as a DF for each EVI (e.g., EVI 1 or EVI Z). As shown by reference number 110, and based on the DF election, PE device 1 may be elected as the DF for EVI Z (e.g., which includes VLAN M). Similarly, as shown by reference number 115 and based on the DF election, PE device N may be elected as the DF for EVI 1 (e.g., which includes VLAN 1).

As shown by reference number 120, PE device 1 may then provide, to the CE device, information indicating that PE device 1 is to act as the DF for EVI Z (e.g., VLAN M). Similarly, as shown by reference number 125, PE device N may provide, to the CE device, information indicating that PE device N is to act as the DF for EVI 1 (e.g., VLAN 1). As shown by reference number 130, the CE device may receive the election information from PE device 1 and the election information from PE device N. As shown, the CE device may, based on the election information, process VLAN 1 traffic such that the VLAN 1 traffic is forwarded to PE device N and may process VLAN M traffic such that the VLAN M traffic is forwarded to PE device 1.

In this way, DF election information, associated with a group of EVIs and a group of PE devices, may be provided to a CE device. This may allow the CE device to perform load balancing of traffic, associated with VLANs included in the group of EVIs and based on the DF election information, such that the traffic is forwarded to corresponding elected DFs (e.g., rather than to non-DFs that may drop the traffic).

Figure 2:
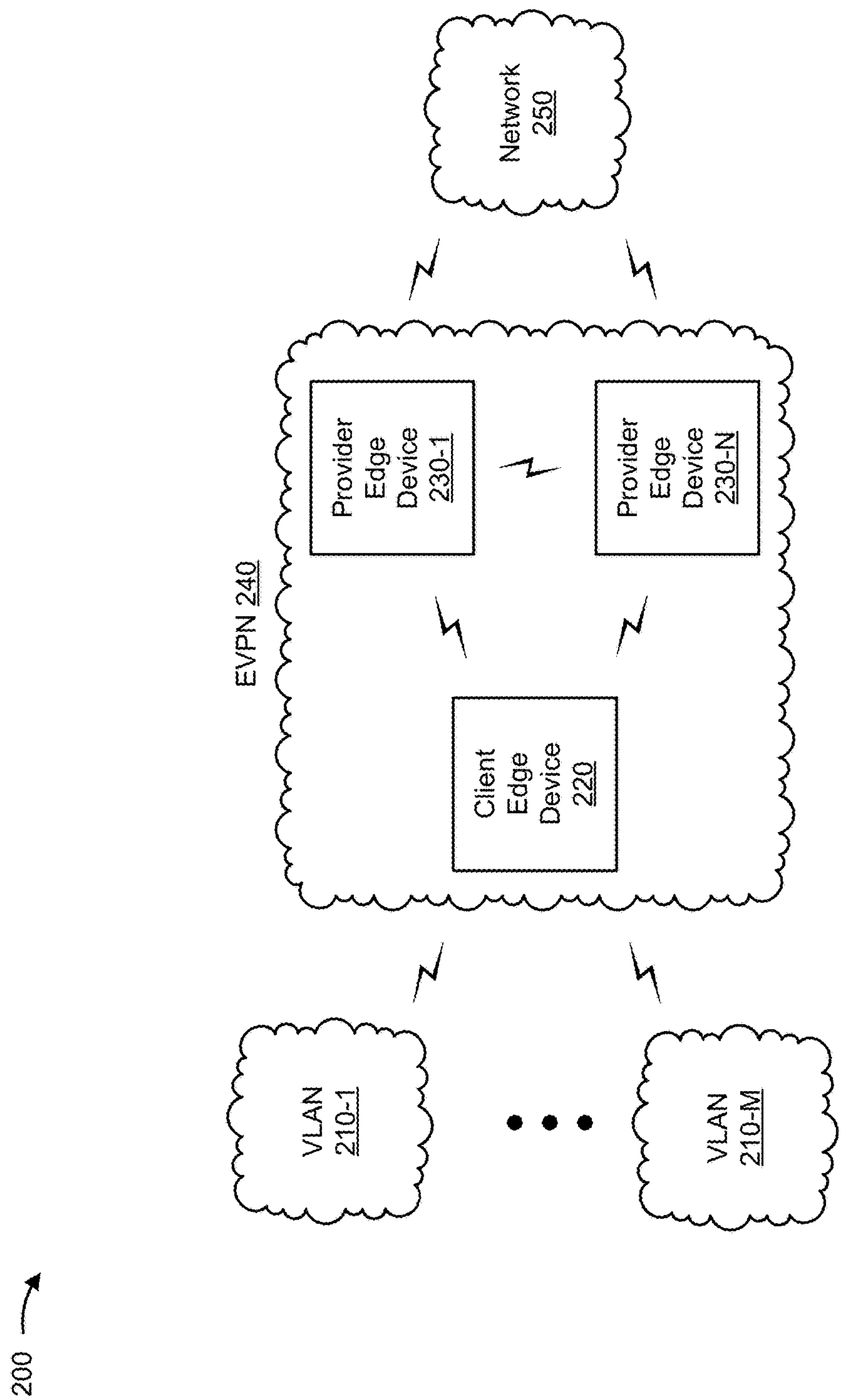
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include one or more VLANs 210-1 through 210-M (M≥1) (hereinafter referred to collectively as VLANs 210, and individually as VLAN 210), a CE device 220, one or more PE devices 230-1 through 230-N(N≥1) (hereinafter referred to collectively as PE devices 230, and individually as PE device 230), an EVPN 240, and a network 250. Devices of environment 200 may interconnect via wired connections, wireless connections, or a combination of wired and wireless connections.

VLAN 210 may include a network including a logical group of devices (e.g., laptop computers, workstations, servers, network devices, etc.) that may appear to be included in a single local area network (LAN) (e.g., even when the devices are geographically separated). VLAN 210 may allow the group of devices to communicate as though the group of devices exists in a single LAN and shares a single broadcast domain and/or multicast domain. In some implementations, VLAN 210 may be associated with a particular EVI (e.g., a routing and forwarding instance of a particular EVPN 240) such that traffic, associated with VLAN 210, is provided via the particular EVPN 240. Additionally, or alternatively, devices of VLAN 210 may be configured to send and/or receive traffic, associated with VLAN 210, to and/or from CE device 220 associated with the particular EVPN 240.

CE device 220 may include a device, associated with a client of a service provider (e.g., located at a client premises), that is connected to PE device 230. For example, CE device 220 may include a switch, a router, a server, a gateway, a modem, a firewall, a network interface controller (NIC), a hub, a bridge, an optical add drop multiplexer (OADM), or another type of data transfer device. In some implementations, devices included in VLAN 210 may communicate with other devices included in VLAN 210 via CE device 220. In some implementations, CE device 220 may be configured to choose PE device 230 to which to provide traffic, associated with VLAN 210, in order to load balance traffic between links to PE devices 230. In some implementations, CE device 220 may be included in one or more EVIs (e.g., associated with one or more EVPNs 240). Additionally, or alternatively, CE device 220 may be included in a network segment with one or more PE devices 230.

PE device 230 may include a device, associated with a service provider, that is connected to CE device 220. For example, PE device 230 may include a switch, a router, a server, a gateway, a modem, a firewall, a NIC, a hub, a bridge, a OADM, or another type of data transfer device. In some implementations, devices included VLAN 210 may communicate with other devices included in VLAN 210 via PE device 230. In some implementations, PE device 230 may be included in one or more EVIs (e.g., associated with one or more EVPNs 240), and may send and/or receive traffic (e.g., VLAN 210 traffic) associated with the one or more EVIs. In some implementations, PE device 230 may communicate with other PE devices 230 in order to perform a DF election associated with a group of EVIs. Additionally, or alternatively, PE device 230 may be included in a network segment with CE device 220 and/or one or more other PE devices 230.

EVPN 240 may include an Ethernet based virtual private network that allows devices included in VLAN 210 to communicate with other devices included in VLAN 210. In some implementations, EVPN 240 may include one or more CE devices 220, PE devices 230, and/or other devices. In some implementations, a routing and forwarding instance of EVPN 240 may be referred to as an EVI. In some implementations, two or more EVIs may overlap within EVPN 240 (e.g., such that the two or more EVIs include a common group of CE devices 220 and/or PE devices 230).

Network 250 may include a network associated with routing and/or forwarding traffic provided via EVPN 240. For example, network 250 may a multi-protocol label switching (MPLS) based network, an internet protocol (IP) based network and/or another type of network through which traffic, associated with VLAN 210 and/or EVPN 240 may travel.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
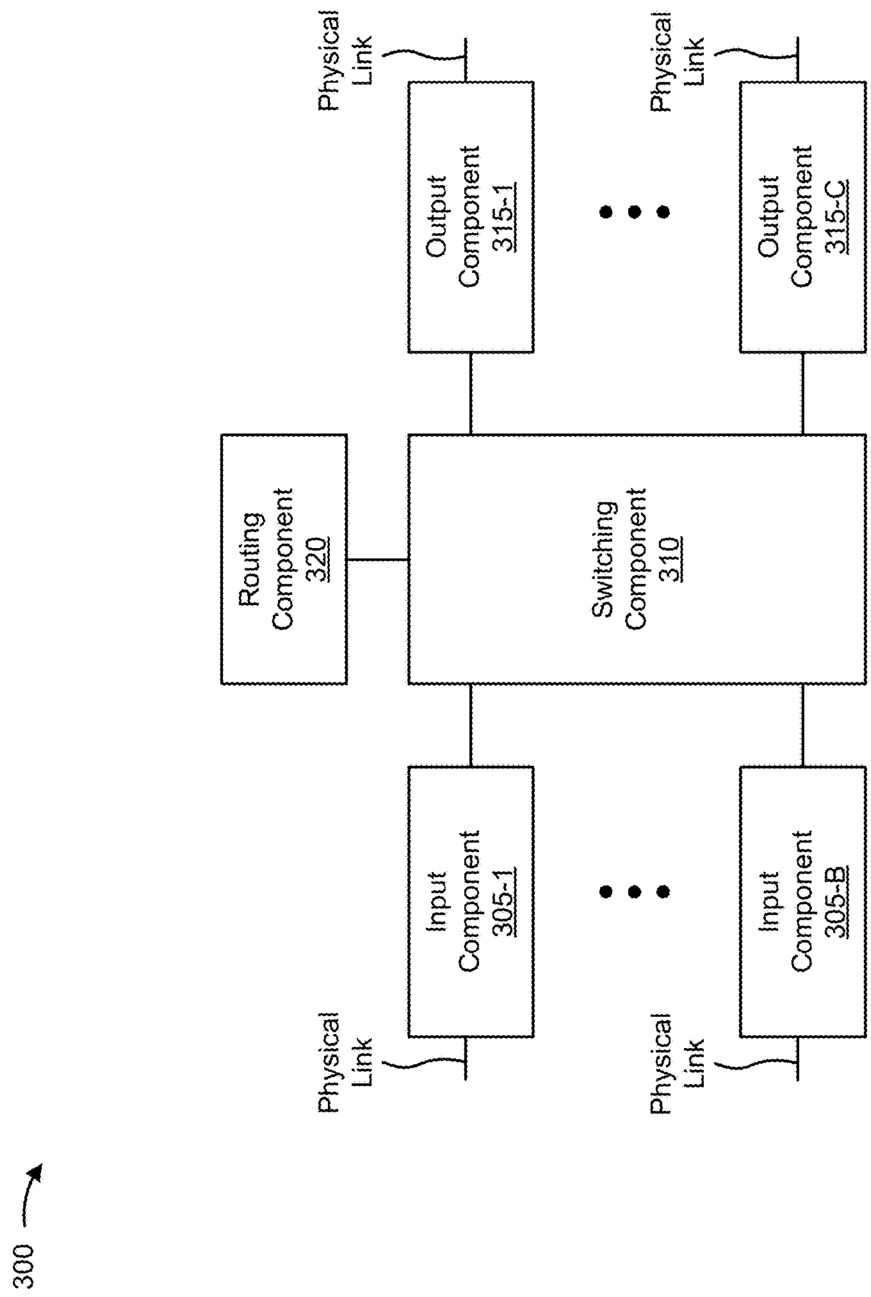
FIG. 3 is a diagram of example components of one or more devices of FIG. 2.

FIG. 3 is a diagram of example components of a device 300. Device 300 may correspond to CE device 220 and/or PE device 230. In some implementations, CE device 220 and/or PE device 230 may include one or more devices 300 and/or one or more components of device 300. As shown in FIG. 3, device 300 may include one or more input components 305-1 through 305-B (B≥1) (hereinafter referred to collectively as input components 305, and individually as input component 305), a switching component 310, one or more output components 315-1 through 315-C(C≥1) (hereinafter referred to collectively as output components 315, and individually as output component 315), and a routing component 320.

Input component 305 may be points of attachment for physical links and may be points of entry for incoming traffic, such as packets. Input components 305 may process incoming traffic, such as by performing data link layer encapsulation or decapsulation. In some implementations, input components 305 may send and/or receive packets. In some implementations, network device 210 may include one or more input components 305.

Switching component 310 may interconnect input components 305 with output components 315. In some implementations, switching component 310 may be implemented via one or more crossbars, via busses, and/or with shared memories. The shared memories may act as temporary buffers to store packets from input components 305 before the packets are eventually scheduled for delivery to output components 315. In some implementations, switching component 310 may enable input components 305, output components 315, and/or routing component 320 to communicate.

Output component 315 may store packets and may schedule packets for transmission on output physical links. Output components 315 may support data link layer encapsulation or decapsulation, and/or a variety of higher-level protocols. In some implementations, output components 315 may send packets and/or receive packets. In some implementations, network device 210 may include one or more output components 315.

Routing component 320 may include one or more processors, microprocessors, application-specific integrated circuits (ASICs), field programmable gate arrays (FPGAs), or similar types of processing components. In some implementations, routing component 320 may communicate with other devices, networks, and/or systems connected to network device 210 to exchange information regarding network topology. Routing component 320 may create routing tables based on the network topology information, create forwarding tables based on the routing tables, and forward the forwarding tables to input components 305 and/or output components 315. Input components 305 and/or output components 315 may use the forwarding tables to perform route lookups for incoming and/or outgoing packets. In some implementations, device 300 may perform processes, described herein, in response to routing component 320 executing software instructions stored by a computer-readable medium, such as memory and/or storage component included in routing component 320. A computer-readable medium is defined herein as a non-transitory memory device.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
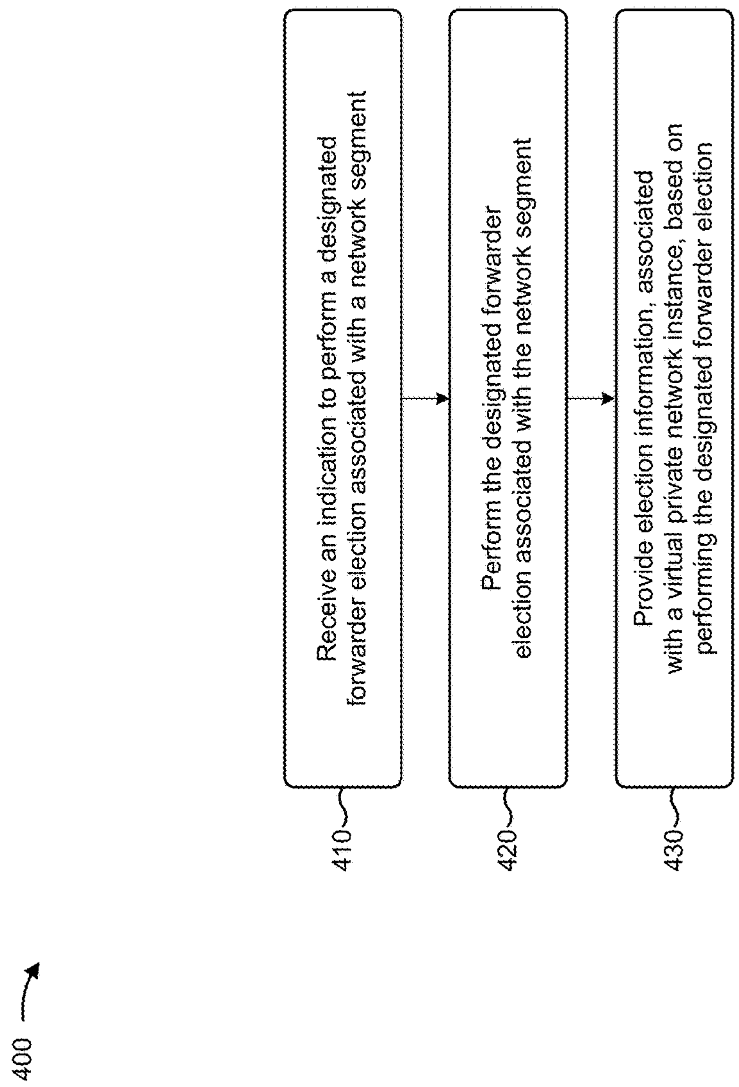
FIG. 4 is a flow chart of an example process for performing a designated forwarder election, associated with a network segment, and providing election information, associated with a virtual private network instance, based on performing the designated forward election.

FIG. 4 is a flow chart of an example process 400 for performing a designated forwarder election, associated with a network segment, and providing election information, associated with a virtual private network instance, based on performing the designated forward election. In some implementations, one or more process blocks of FIG. 4 may be performed by PE device 230. In some implementations, one or more process blocks of FIG. 4 may be performed by another device or a group of devices separate from or including PE device 230, such as CE device 220.

As shown in FIG. 4, process 400 may include receiving an indication to perform a designated forwarder election associated with a network segment (block 410). For example, PE device 230 may receive an indication to perform a DF election associated with a network segment (e.g., an Ethernet segment). In some implementations, PE device 230 may receive the indication when the indication is provided by another device. Additionally, or alternatively, PE device 230 may receive the indication when PE device 230 is powered up, configured, re-configured, or at another time.

A DF election, may include a process for identifying a particular PE device 230 that is to forward traffic associated with an EVI (e.g., traffic associated with one or more VLANs 210 included in the EVI). For example, assume that CE device 220 is multi-homed to two or more PE devices 230 in an EVI on a given network segment, and a VLAN 210 identifier (e.g., an Ethernet tag) is configured on the network segment. In this example, a particular PE device 230 may be responsible for certain actions associated with the EVI, such as sending multicast traffic and/or broadcast traffic, associated with VLAN 210, to CE device 220. In some implementations, the DF election may result in an election of multiple DFs (e.g., multiple PE devices 230) per network segment (one per EVI) (e.g., in order to perform load balancing of traffic destined to the network segment). Here, a result of performing the DF election may identify the particular PE device 230. Additional details regarding performing the DF election are described below.

In some implementations, PE device 230 may receive the indication based on information associated with the network segment. For example, PE device 230 may receive the indication when PE device 230 discovers (e.g., based on a configuration of PE device 230) the ESI of the network segment. As another example, PE device 230 may receive the indication when PE device 230 receives information associated a network segment failure (e.g., a link failure, a port failure, etc.), and a particular PE device 230 (e.g., affected by the failure) provides information associated with the network segment failure. Additionally, or alternatively, PE device 230 may receive the indication based on information associated with another PE device 230 (e.g., when the other PE device 230 experiences an error, when the other PE device 230 is commissioned, when the other PE device 230 is decommissioned, etc.). Additionally, or alternatively, PE device 230 may receive the indication based on information provided by a user associated with the service provider network (e.g., when the user provides input indicating that PE device 230 is to perform the DF election).

As further shown in FIG. 4, process 400 may include performing the designated forwarder election associated with the network segment (block 420). For example, PE device 230 may perform the DF election associated with the network segment. In some implementations, PE device 230 may perform the DF election after PE device 230 receives the indication to perform the DF election.

In some implementations, PE device 230 may perform the DF election based on information associated with one or more other PE devices 230. For example, in one example implementation, PE device 230 may receive the indication, and may provide, to other PE devices 230, information indicating that PE device 230 is associated with the network segment and a network address (e.g., an IP address) that identifies PE device 230 (e.g., other PE devices 230 may simultaneously act similarly). PE device 230 may then wait for a threshold amount of time (e.g., based on a three second timer, a five second timer, etc.) to allow the other PE devices 230 to provide, to PE device 230, information indicating that the other PE devices 230 are also associated with the network segment, and network addresses corresponding to the other PE devices. When the threshold amount of time is satisfied, PE device 230 may have network addresses that correspond to all PE devices 230 connected to the network segment. PE device 230 may then generate an ordered list of network addresses for all PE devices 230 connected to the network segment (e.g., from a smallest IP address to a largest IP address). PE device 230 may then assign a value to each PE device 230 (e.g., PE device 230 with the smallest IP address may be assigned to a value of 0, PE device 230 with a next smallest IP address may be assigned to a value of 1, etc.) in order to identify a position in the ordered list that corresponds to each PE device 230.

The ordered list and the values (e.g., each value corresponding to a particular PE device 230) may then be used to identify a particular PE device 230 that is to act as a DF for VLAN 210 associated with a given EVI on the network segment based on a rule. An example rule may be, assuming a group of N PE devices 230, PE device 230 assigned to a value equal to i is to act as a DF for VLAN 210 (e.g., with an associated VLAN 210 identifier value V) associated with an EVI, when (V mod N)=i. In a case where multiple VLANs 210 are associated with a single EVI, the numerically lowest VLAN 210 identifier value V for VLANs 210 associated with that EVI is to be used in the modulo function. When PE device 230 is elected to act as a DF for a given EVI, PE device 230 may unblock traffic for VLANs 210 associated with that EVI (e.g., while other (non-DF) PE devices 230 may continue to drop traffic for VLANs 210 associated with that EVI. In this way, a group of PE devices 230 may determine which PE device 230, of the group of PE devices 230, is to act as a DF for each VLAN associated with each EVI. Other rules may alternatively or additionally be used to identify the particular PE device 230 to act as the DF.

As further shown in FIG. 4, process 400 may include providing election information, associated with a virtual private network instance, based on performing the designated forwarder election associated with the virtual private network instance (block 430). For example, PE device 230 may provide election information based on performing the DF election. In some implementations, PE device 230 may provide the election information after PE device 230 performs the DF election. Additionally, or alternatively, PE device 230 may provide the election information when PE device 230 receives information indicating that PE device 230 is to provide the election information.

Election information may include information associated with an EVI for which PE device 230 is to act as a DF. For example, the election information may include information that identifies PE device 230 (e.g., a network address, a device identifier, etc.), information that identifies the EVI (e.g., an EVI identifier, an EVI number, etc.) for which PE device 230 is to act as a DF, information that identifies an EVI for which PE device 230 is a not to act as a DF, information that identifies one or more VLANs 210 associated with the EVI for which PE device 230 is to act as a DF, information that identifies a range of VLANs 210 associated with the EVI for which PE device 230 is to act as a DF, information that identifies the network segment (e.g., an ESI) associated with the DF election, and/or other information associated with the DF election.

In some implementations, PE device 230 may provide the election information to CE device 220. In some implementations, multiple PE devices 230, that have been elected to act as DFs for VLAN 210 traffic associated with corresponding EVIs, may provide election information to CE device 220. In this way, election information, associated with each EVI associated with the network segment, may be provided to CE device 220. In some implementations, CE device 220 may receive the election information and may process traffic, associated with VLAN 210 included in each EVI, based on the election information, as described below.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5A:
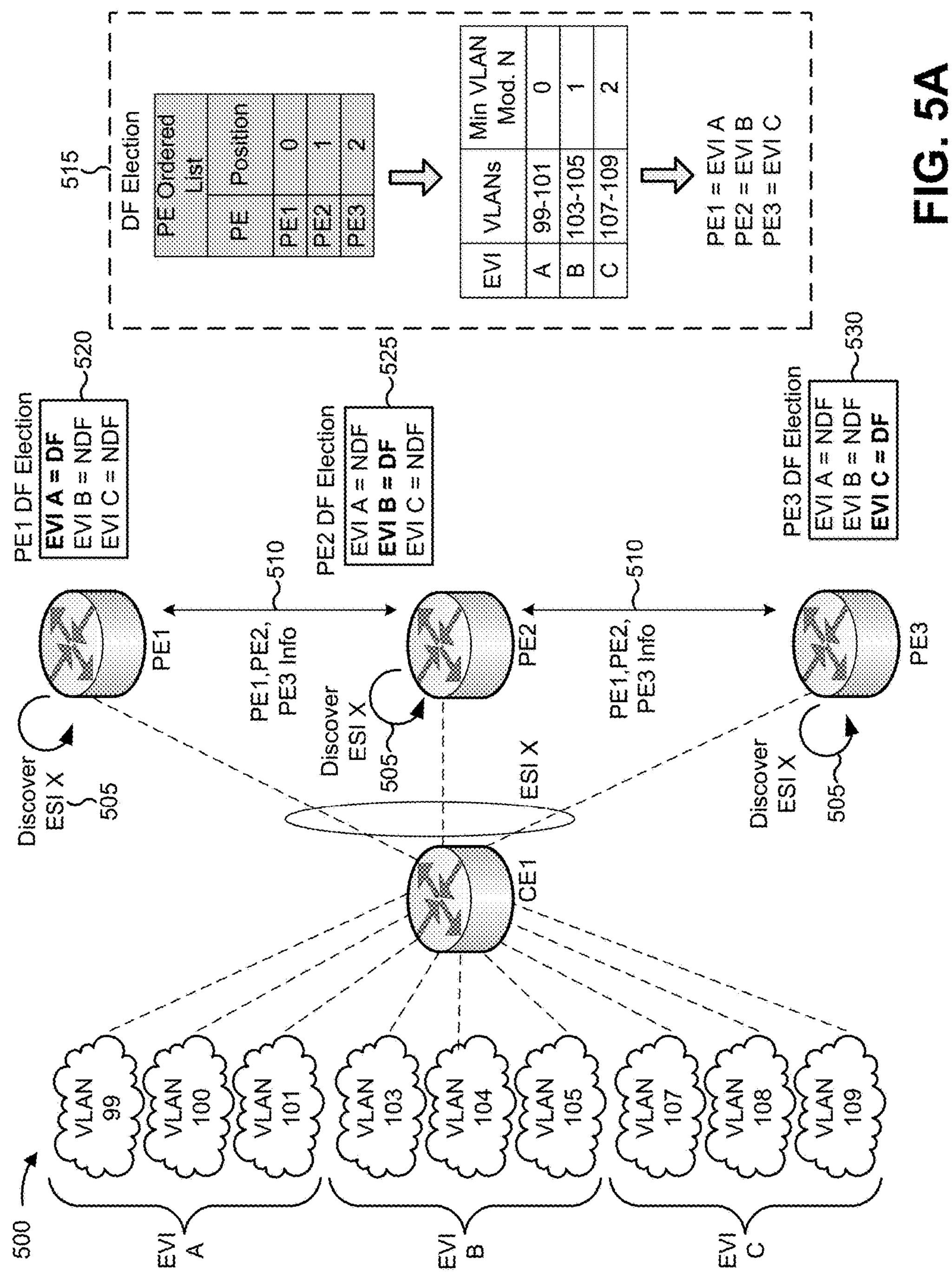
FIGS. 5A and 5B are diagrams of an example implementation relating to the example process shown in FIG. 4.
Figure 5B:
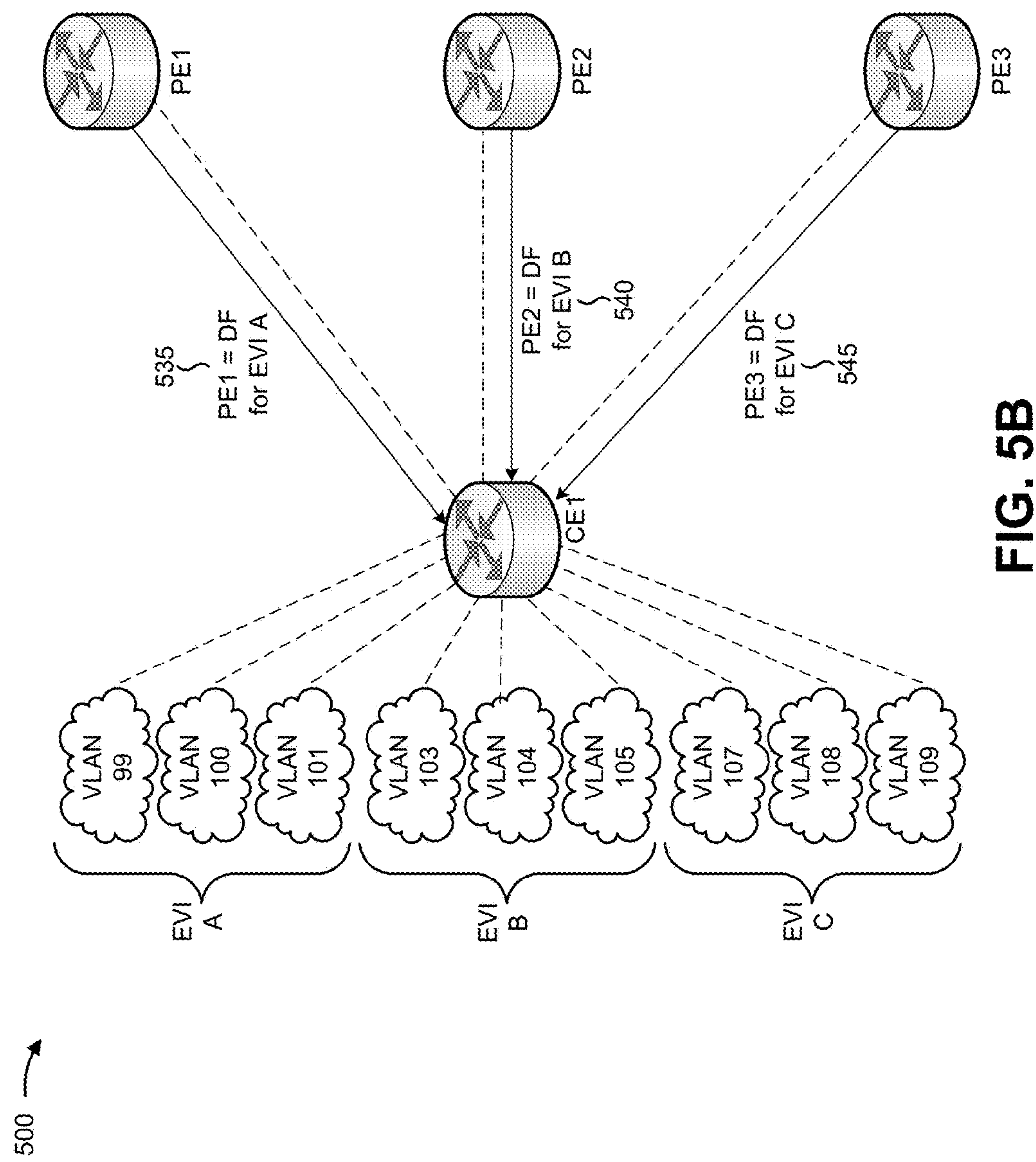

FIGS. 5A and 5B are diagrams of an example implementation 500 relating to example process 400 shown in FIG. 4. For the purposes of example implementation 500, assume that an EVPN 240 includes a CE device 220 (e.g., CE1) and a group of PE devices 230 configured to operate in single-active mode (e.g., PE1, PE2, and PE3), and that CE1 is multi-homed to PE1, PE2, and PE3 via a network segment (e.g., ESI X). Further, assume that a first group of VLANs 210 (e.g., VLAN 99, VLAN 100, and VLAN 101), is associated with a first EVI (e.g., EVI A) implemented on EVPN 240, and devices in each of the first group of VLANs 210 are configured to provide traffic via CE1. Also, assume that a second group of VLANs 210 (e.g., VLAN 103, VLAN 104, and VLAN 105), is associated with a second EVI (e.g., EVI B) implemented on EVPN 240, and devices in each of the second group of VLANs 210 are configured to provide traffic via CE1. Finally, assume that a third group of VLANs 210 (e.g., VLAN 107, VLAN 108, and VLAN 109), is associated with a third EVI (e.g., EVI C) implemented on EVPN 240, and devices in each of the third group of VLANs 210 are configured to provide traffic via CE1 is configured to provide traffic via CE1.

As shown in FIG. 5A, and by reference number 505, PE1, PE2, and PE3 may discover ESI X (e.g., when ESI X is established, PE1, PE2, and PE3 may discover ESI X approximately simultaneously), and may determine that a DF election is to be performed for ESI X. As shown by reference number 510, and based on determining that the DF election is to be performed, PE1 may provide (e.g., to PE2 and PE3) information that identifies PE1 (e.g., an IP address that identifies PE1) and information indicating that PE1 is included in ESI X, PE2 may provide (e.g., to PE1 and PE3) information that identifies PE2 (e.g., an IP address that identifies PE2) and information indicating that PE2 is included in ESI X, and PE3 may provide (e.g., to PE1 and PE2) information that identifies PE3 (e.g., an IP address that identifies PE3) and information indicating that PE3 is included in ESI X. For the purposes of example implementation 500, assume that the PE1 IP address is smaller than the PE2 IP address and the PE3 IP address, and that the PE2 IP address is smaller than the PE 3 IP address.

As shown by reference number 515, PE1, PE2, and PE3 may perform the DF election for ESI X. Henceforth, the DF election is described in the context of PE1 performing the DF election. However, PE2 and PE3 may similarly perform the DF election (e.g., while PE1 performs the DF election). As shown by reference number 515, PE1 may generate an ordered list based on the PE1 IP address, the PE2 IP address, and the PE3 IP address. As shown, PE1 may assigned to a value of 0 in the ordered list (e.g., since PE1 has the smallest IP address), PE2 may assigned to a value of 1 in the ordered list (e.g., since PE2 has the next smallest IP address), and PE3 may assigned to a value of 2 in the ordered list (e.g., since PE1 has the largest IP address). As further shown, PE1 may then compute (e.g., based on a modulo function of V mod N=i) a modulo value associated with each EVI (e.g., based on the smallest VLAN 210 identifier associated with each EVI). As shown, PE1 may compute an EVI A modulo value as being equal to 0 (e.g., since 99 mod 3=0), an EVI B modulo value as being equal to 1 (e.g., since 100 mod 3=1), and an EVI C modulo value as being equal to 2 (e.g., since 107 mod 3=2). Based on these modulo values, PE1 may determine that PE1 is to act as a DF for the first group of VLANs 210 included in EVI A (e.g., since PE1 is at position 0 in the ordered list and the EVI A modulo value is equal to 0), that PE2 is to act as a DF for the second group of VLANs 210 included in EVI B (e.g., since PE2 is at position 1 in the ordered list and the EVI B modulo value is equal to 1), and that PE3 is to act as a DF for the third group of VLANs 210 included in EVI C (e.g., since PE3 is at position 2 in the ordered list and the EVI C modulo value is equal to 2). As stated above, each PE device 230 may perform a similar DF election (e.g., and reach the same DF election result).

As shown by reference number 520, PE1 may update a configuration of PE1 to cause PE1 to act as a DF for the first group of VLANs 210 included in EVI A, as a non-DF for the second group of VLANs 210 included in EVI B, and as a non-DF for the third group of VLANs 210 included in EVI C. As shown by reference number 525, PE2 may update a configuration of PE2 to cause PE2 to act as a non-DF for the first group of VLANs 210 included in EVI A, as a DF for the second group of VLANs 210 included in EVI B, and as a non-DF for the third group of VLANs 210 included in EVI C. As shown by reference number 530, PE3 may update a configuration of PE3 to cause PE3 to act as a non-DF for the first group of VLANs 210 included in EVI A, as a non-DF for the second group of VLANs 210 included in EVI B, and as a DF for the third group of VLANs 210 included in EVI C.

As shown in FIG. 5B, and by reference number 535, PE1 may provide, to CE1, information indicating that PE1 is to act as a DF for the first group of VLANs 210 included in EVI A. Similarly, as shown by reference number 540, PE2 may provide, to CE1, information indicating that PE2 is to act as a DF for the second group of VLANs 210 included in EVI B. As shown by reference number 545, PE3 may provide, to CE1, information indicating that PE3 is to act as a DF for the third group of VLANs 210 included in EVI C. In this way, CE1 may be provided with election information, associated with EVI A, EVI B, and EVI C for ESI X. CE1 may receive the election information and may process traffic, associated with each VLAN 210 included in each EVI, based on the election information, as described below.

As indicated above, FIGS. 5A and 5B are provided merely as an example. Other examples are possible and may differ from what was described with regard to FIGS. 5A and 5B.

Figure 6:
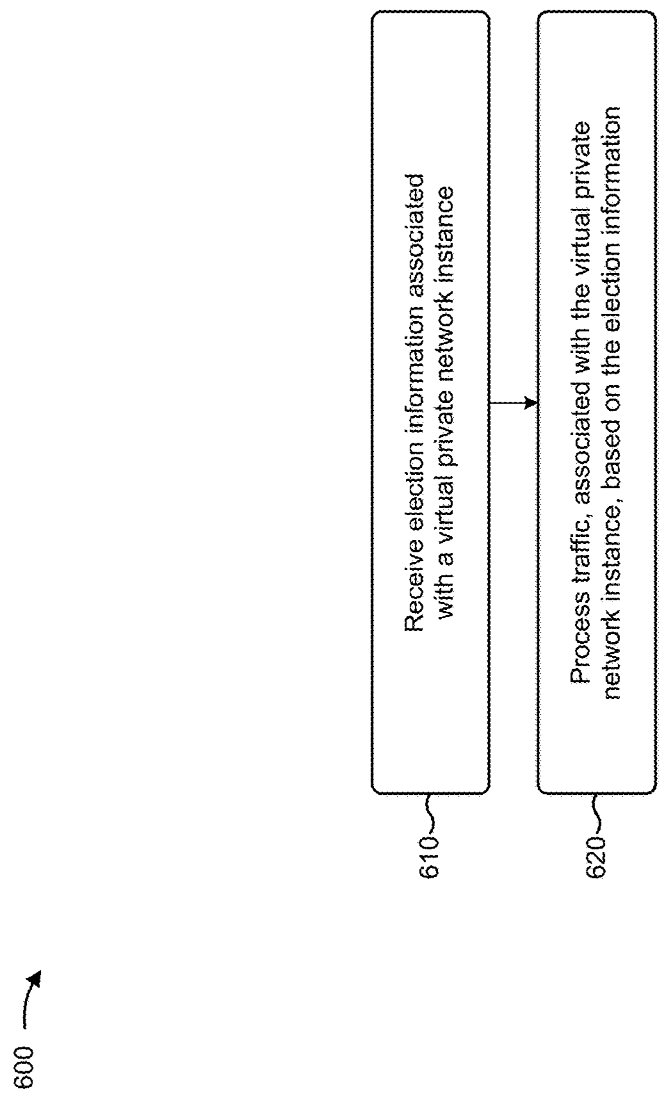
FIG. 6 is a flow chart of an example process for receiving election information, associated with a virtual private network instance, and processing traffic, associated with the virtual private network instance, based on the election information.

FIG. 6 is a flow chart of an example process 600 for receiving election information, associated with a virtual private network instance, and processing traffic, associated with the virtual private network instance, based on the election information. In some implementations, one or more process blocks of FIG. 6 may be performed by CE device 220. In some implementations, one or more process blocks of FIG. 6 may be performed by another device or a group of devices separate from or including CE device 220, such as PE device 230.

As shown in FIG. 6, process 600 may include receiving election information associated with a virtual private network instance (block 610). For example, CE device 220 may receive election information, associated with an EVI. In some implementations, CE device 220 may receive the election information when one or more PE devices 230 provide the election information. Additionally, or alternatively, CE device 220 may receive the election information when CE device 220 requests the election information (e.g., from PE devices 230).

As described above, the election information may include information associated with an EVI for which PE device 230 is to act as a DF. In some implementations, CE device 220 may store the election information in a memory location (e.g., a RAM, a ROM, a cache, a hard disk, etc.) of CE device 220. Additionally, or alternatively, CE device 220 may provide the election information to another device for storage. In some implementations, CE device 220 may store the election information such that previous election information (e.g., election information, associated with one or more PE devices 230, received at an earlier time) is overwritten and/or deleted. Additionally, or alternatively, CE device 220 may store the election information such that CE device 220 may retrieve the election information at a later time (e.g., in order to perform load balancing of VLAN 210 traffic associated with the EVI).

As further shown in FIG. 6, process 600 may include processing traffic, associated with the virtual private network instance, based on the election information (block 620). For example, CE device 220 may process traffic, associated with the EVI, based on the election information. In some implementations, CE device 220 may process the traffic, associated with the EVI, when CE device 220 receives the traffic. Additionally, or alternatively, CE device 220 may process the traffic when CE device 220 performs load balancing associated with the traffic.

In some implementations, CE device 220 may process the traffic in accordance with the election information. For example, assume that a first PE device 230 has been elected to act as a DF for a first VLAN 210 included in a first EVI, and that a second PE device 230 has been elected to act as a DF for a second VLAN 210 included in a second EVI. Further, assume that CE device 220 has received election information associated with the first PE device 230 and the second PE device 230. In this example, if CE device 220 receives first traffic, associated with the first VLAN 210, then CE device 220 may process the first traffic by transferring the first traffic via a link to the first PE device 230. Similarly, if CE device 220 receives second traffic, associated with the second VLAN 210, then CE device 220 may process the second traffic by transferring the second traffic via a link to the second PE device 230.

In this way, CE device 220 may process traffic in accordance with election information, associated with a group of EVIs and a group of PE devices 230, to perform load balancing of traffic, associated with the group of EVIs, such that the traffic is forwarded via an appropriate link (e.g., to a PE device 230 elected to act as a DF for the traffic).

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

Figure 7A:
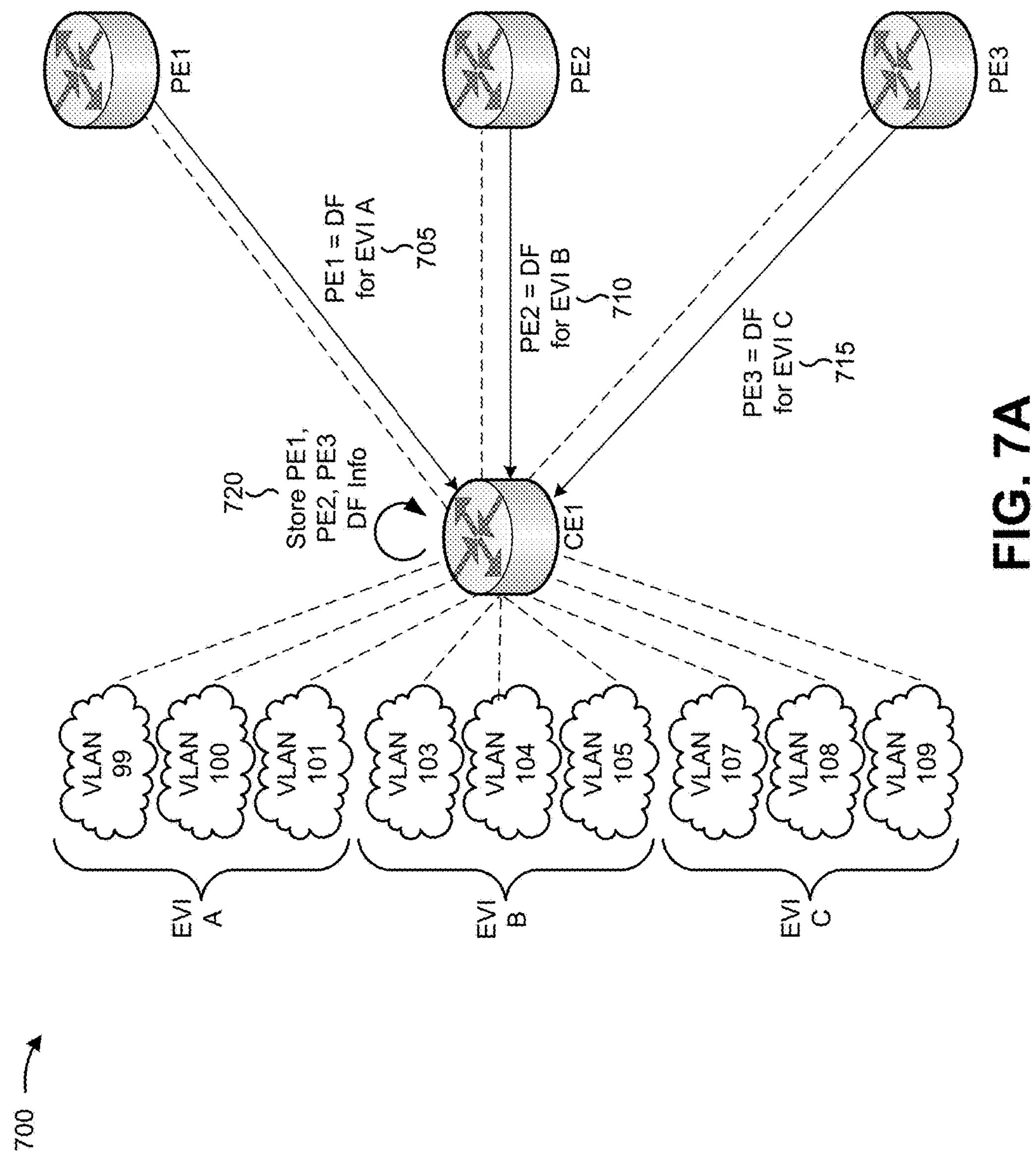
FIGS. 7A and 7B are diagrams of an example implementation relating to the example process shown in FIG. 6.
Figure 7B:
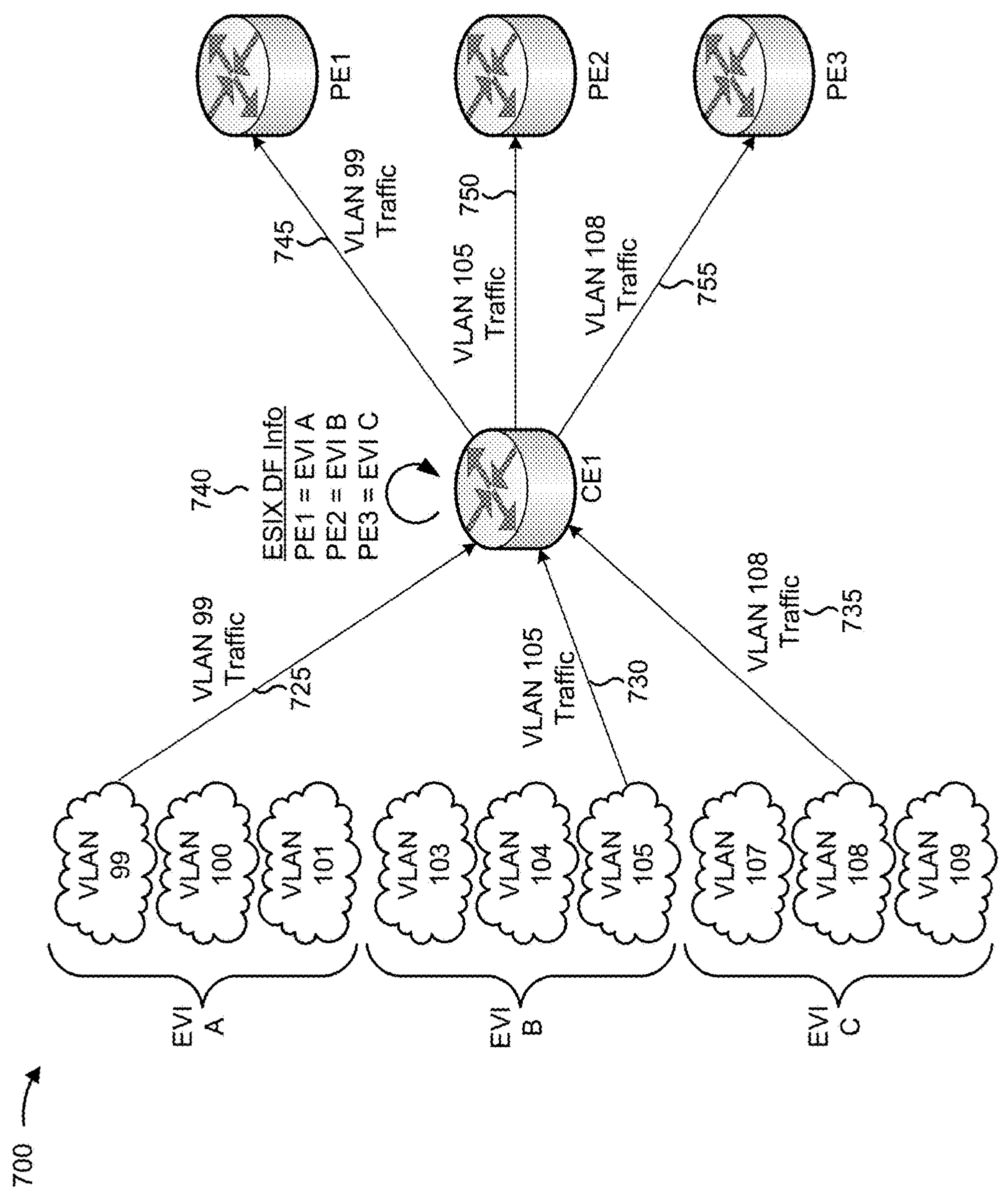

FIGS. 7A and 7B are diagrams of an example implementation 700 relating to example process 600 shown in FIG. 6. For the purposes of example implementation 700, assume that, as described above with respect to example implementation 500, a first PE device 230 (e.g., PE1), associated with a network segment (e.g., ESI X), has been elected to act as a DF for VLANs 210 included in a first EVI (e.g., EVI A) implemented in EVPN 240, a second PE device 230 (e.g., PE2), associated with ESI X, has been elected to act as a DF for VLANs 210 included in a second EVI (e.g., EVI B) implemented in EVPN 240, and that a third PE device 230 (e.g., PE3), associated with ESI X, has been elected to act as a DF for VLANs 210 included in a third EVI (e.g., EVI C) implemented in EVPN 240. Further, assume that EVI A includes a first group of VLANs 210 (e.g., VLAN 99, VLAN 100, and VLAN 101), that EVI B includes a second group of VLANs 210 (e.g., VLAN 103, VLAN 104, and VLAN 105), and that EVI C includes a third group of VLANs 210 (e.g., VLAN 107, VLAN 108, and VLAN 109).

As shown in FIG. 7A, and by reference number 705, CE1 may receive, from PE1, information indicating that PE1 is to act as a DF for EVI A (e.g., VLANs 99, 100, and 101). Similarly, as shown by reference number 710, CE1 may receive, from PE2, information indicating that PE2 is to act as a DF for EVI B (e.g., VLANs 103, 104, and 105). As shown by reference number 715, CE1 may receive, from PE3, information indicating that PE3 is to act as a DF for EVI C (e.g., VLANs 107, 108, and 109). As shown by reference number 720, CE1 may store the election information associated with PE1, the election information associated with PE2, and the election information associated with PE3.

As shown in FIG. 7B, and by reference number 725, CE1 may receive (e.g., from one or more devices included in VLAN 99) traffic associated with VLAN 99. As shown by reference number 730, CE1 may receive (e.g., from one or more devices included in VLAN 105) traffic associated with VLAN 105. As shown by reference number 735, CE1 may receive (e.g., from one or more devices included in VLAN 108) traffic associated with VLAN 108. As shown by reference number 740, CE1 may determine (e.g., based on the election information stored by CE1) that PE1 is acting as a DF for VLAN 99, that PE2 is acting as a DF for VLAN 105, and that PE3 is acting as a DF for VLAN 108. As shown by reference number 745, based on the election information, CE1 may provide the VLAN 99 traffic to PE1. As shown by reference number 750, based on the election information, CE1 may provide the VLAN 105 traffic to PE2. As shown by reference number 755, based on the election information, CE1 may provide the VLAN 108 traffic to PE3.

As indicated above, FIGS. 7A and 7B are provided merely as an example. Other examples are possible and may differ from what was described with regard to FIGS. 7A and 7B.

Implementations described herein may allow DF election information, associated with a group of EVIs and a group of PE devices, to be provided to a CE device. This may allow the CE device to perform load balancing of traffic, associated with VLANs included in the group of EVIs, based on the DF election information in order to cause the traffic, associated with the VLANs, to be forwarded to corresponding elected DFs (e.g., rather than to non-DFs that may drop the traffic).

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items, and may be used interchangeably with "one or more." Where only one item is intended, the term "one" or similar language is used. Also, as used herein, the terms "has,"

"have," "having," or the like are intended to be open-ended terms. Further, the phrase "based on" is intended to mean "based, at least in part, on" unless explicitly stated otherwise.

What is claimed is:

1. A provider edge (PE) device, comprising:

one or more processors to:

receive an indication to perform a designated forwarder (DF) election associated with a network segment, the network segment including the PE device, one or more other PE devices, and a client edge (CE) device, the PE device, the one or more other PE devices, and the CE device being associated with an Ethernet virtual private network (EVPN), the EVPN including a group of EVPN instances (EVIs);

generate an ordered PE list comprising information identifying the PE device and the one or more other PE devices;

determine a group of modulo values that correspond to identifier values associated with VLANs included in the group of EVIs;

perform the DF election, associated with the network segment and based on the ordered PE list and the group of modulo values, in order to determine election information associated with the PE device, the election information including information associated with a first EVI, of the group of EVIs, for which the PE device is to act as a DF, and the election information indicating that the PE device is not to act as the DF for a second EVI of the group of EVIs; and provide the election information to the CE device, the election information being provided to cause the CE device to provide first traffic, associated with a VLAN included in the first EVI, to the PE device, and the election information being provided to cause the CE device to not provide the first traffic to another PE device that is not a DF for the first EVI.

2. The PE device of claim 1, where the PE device and each of the one or more other PE devices operate in a single-active mode.

3. The PE device of claim 1, where the one or more processors are further to:

determine a network address that corresponds to the PE device;

determine one or more other network addresses that correspond to the one or more other PE devices; and where the one or more processors, when generating the ordered PE list, are to:

generate the ordered PE list based on the network address and the one or more other network addresses.

4. The PE device of claim 1, where the election information is provided to the CE device via a link between the PE device and the CE device, the link being included in the network segment.

5. The PE device of claim 1, where the election information includes information that identifies at least one of:

the first EVI for which the PE device is to act as the DF;

the VLAN included in the first EVI;

a group of VLANs included in the first EVI, the group of VLANs including the VLAN;

the network segment; or the PE device.

6. The PE device of claim 1, where the one or more processors are further to:

send a network address, associated with the PE device, to the one or more other PE devices; and receive, from the one or more other PE devices and based on sending the network address, network addresses, associated with the one or more other PE devices, and network information that indicates that the one or more other PE devices are included in the network segment associated with the PE device; and where the one or more processors, when performing the DF election, are to:

perform the DF election based on the network addresses and the network information.

7. The PE device of claim 1, where the one or more processors, when performing the DF election, are to:

perform the DF election based on identifying a modulo value, of the group of modulo values, that corresponds to the PE device in the ordered PE list.

8. A system, comprising:

a set of provider edge (PE) devices; and a client edge (CE) device, the set of PE devices and the CE device being included in an Ethernet segment and being included in an Ethernet virtual private network (EVPN), the EVPN being associated with a group of EVPN instances (EVIs);

where a PE device, of the set of PE devices, is to:

generate an ordered PE list comprising information identifying the set of PE devices;

determine a group of modulo values that correspond to identifier values associated with VLANs included in the group of EVIs;

receive an indication to perform a designated forwarder (DF) election associated with the Ethernet segment;

perform the DF election, associated with the Ethernet segment and based on the ordered PE list and the group of modulo values, in order to determine election information associated with the PE device, the election information including information associated with a first EVI, of the group of EVIs, for which the PE device is to act as a DF, and the election information indicating that the PE device is not to act as the DF for a second EVI of the group of EVIs; and provide the election information to the CE device; and where the CE device is to:

receive the election information provided by the PE device;

based on the election information, send first traffic, associated with a first VLAN included in the first EVI, to the PE device; and based on the election information, not send the first traffic to another PE device that is not a DF for the first EVI.

9. The system of claim 8, where each PE device of the set of PE devices operates in a single-active mode.

10. The system of claim 8, where the PE device is to:

determine a network address that corresponds to the PE device;

determine other network addresses that correspond to other PE devices included in the set of PE devices; and where the PE device, when generating the ordered PE list, is to:

generate the ordered PE list based on the network address and the other network addresses.

11. The system of claim 8, where the election information is provided to the CE device via a link connecting the PE device to the CE device, the link being included in the Ethernet segment.

12. The system of claim 8, where the CE device is further to:

receive other election information provided by another PE device included in the set of PE devices, the other election information including information associated with another EVI, of the group of EVIs, for which the other PE device is to act as the DF; and forward other traffic, associated with another VLAN and based on the other election information, included in the other EVI to the other PE device.

13. The system of claim 8, where the PE device is further to:

send a network address, associated with the PE device, to one or more other PE devices of the set of PE devices;

receive, from the one or more other PE devices and based on sending the network address, network addresses associated with the one or more other PE devices, the PE device receiving the network addresses within a threshold amount of time; and where the PE device, when performing the DF election, is to:

perform the DF election based on the network addresses associated with the one or more other PE devices.

14. The system of claim 8, where the PE device, when performing the DF election, is to:

perform the DF election based on identifying a modulo value, of the group of modulo values, that corresponds to the PE device in the ordered PE list.

15. A method, comprising:

receiving, by a provider edge (PE) device, an indication to perform a designated forwarder (DF) election associated with a network segment, the network segment including the PE device, at least one other PE device, and a client edge (CE) device, the PE device, the at least one other PE device, and the CE device being included in an Ethernet virtual private network (EVPN), the EVPN comprising a group of EVPN instances (EVIs);

generating, by the PE device, an ordered PE list comprising information identifying the PE device and the at least one other PE device;

determining, by the PE device, a group of modulo values that correspond to identifier values associated with VLANs included in the group of EVIs;

performing, by the PE device, the DF election, associated with the network segment and based on the ordered PE list and the group of modulo values, in order to determine election information associated with the PE device, the election information including information associated with a first EVI, of the group of EVIs, for which the PE device is to act as a DF, and the election information indicating that the PE device is not to act as a DF for a second EVI of the group of EVIs; and providing, by the PE device, the election information to the CE device, the election information causing the CE device to process first traffic, associated with a group of VLANs included in the first EVI, such that the first traffic is provided to the PE device, and the election information causing the CE device to process the first traffic, such that the first traffic is not provided to another PE device that is not a DF for the first EVI.

16. The method of claim 15, where the PE device and each of the at least one other PE device operate in a single-active mode.

17. The method of claim 15, further comprising:

determining a network address that corresponds to the PE device;

determining at least one other network address that corresponds to the at least one other PE device; and where generating the ordered PE list comprises:

generating the ordered PE list based on the network address and the at least one other network address.

18. The method of claim 15, where the election information is provided to the CE device via a link between the PE device and the CE device, the link being included in the network segment.

19. The method of claim 17, further comprising:

assigning a value to the PE device, the value corresponding to an Internet Protocol (IP) address associated with the PE device; and where generating the ordered PE list comprises:

generating the ordered PE list based on the value assigned to the PE device.

20. The method of claim 15, where performing the DF election comprises:

performing the DF election based on identifying a modulo value, of the group of modulo values, that corresponds to the PE device in the ordered PE list.

* * * * *